M. Dewey,
Drag Saw.
N°. 41,910.                    Patented Mar. 15, 1864.
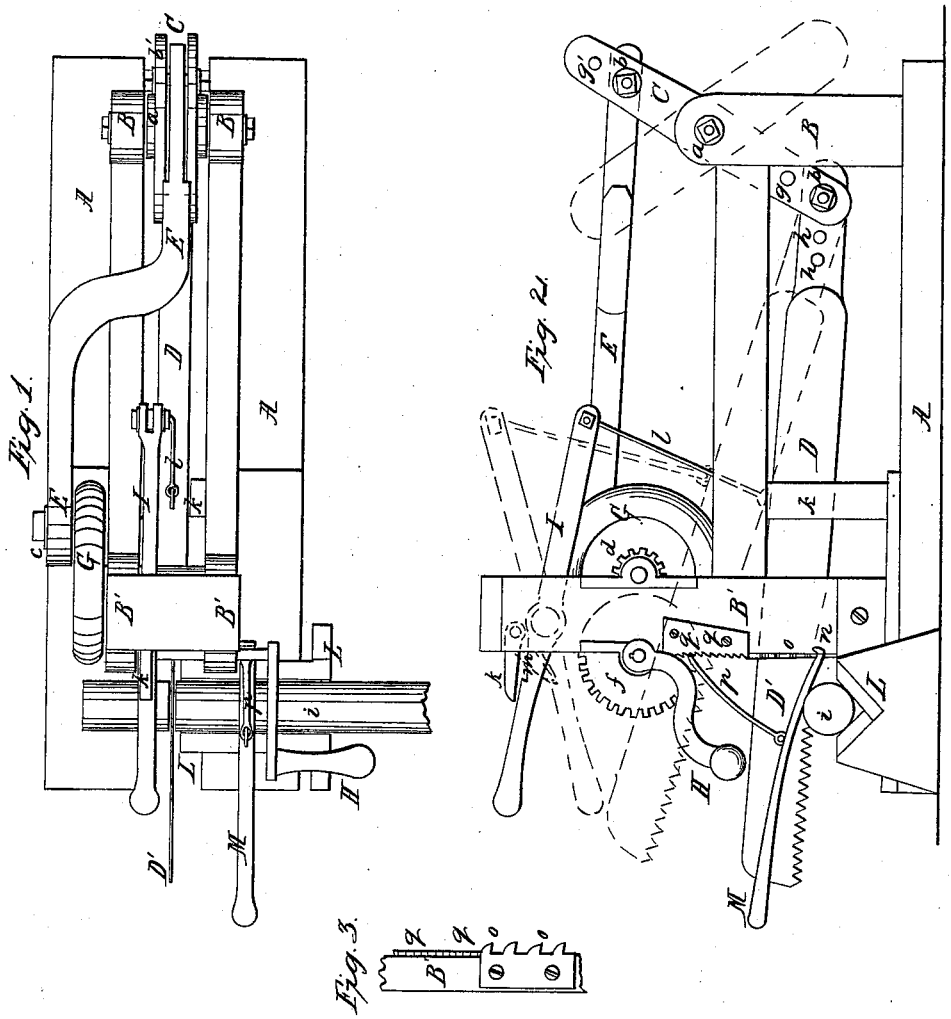
Witnesses:
Chas. F. Spencer
R. F. Osgood
Inventor:
Morris Dewey.
by J. Fraser & Co., attys

UNITED STATES PATENT OFFICE.

MORRIS DEWEY, OF CLARENDON, NEW YORK.

IMPROVEMENT IN WOOD-SAWING MACHINES.

Specification forming part of Letters Patent No. 41,910, dated March 15, 1864.

*To all whom it may concern:*

Be it known that I, MORRIS DEWEY, of Clarendon, in the county of Orleans and State of New York, have invented certain new and useful Improvements in Machines for Sawing Wood; and I do hereby declare that the following is a full and exact description thereof, reference being had to the accompanying drawings, making part of this specification.

Figure 1 is a plan of my improved machine; Fig. 2, a side elevation thereof; Fig. 3, a view of the ratchets with which the lever for holding the wood in place is connected.

Like letters of reference indicate corresponding parts in all the figures.

My improved machine is of that class where a cross-cut reciprocating saw, mounted in a suitable frame and operated by a crank, is employed for sawing sticks, office-wood, logs, &c.

As represented in the drawings, A is the frame, having at opposite ends standards B B and B' B', respectively. Between the standards B B is mounted a rock-lever, C, centrally on a pivot, $a$. The rock-lever has jointed to its lower end, as shown at $b$, the shank D of the saw D', which extends forward through the entire length of the frame, and has jointed to its upper end at $b'$ a pitman or connecting-rod, E, whose opposite end is connected with the crank $c$ of a balance-wheel, G. This balance-wheel is driven by means of a pinion, $d$, on its shaft, into which gears a cog-wheel, $f$, operated by a winch, H. This arrangement of the gearing does not differ essentially from that in general use in this class of machines.

In order to vary the length of stroke of the saw, I make a set of adjusting-holes, $g\ g$, in the lower end of the rock-lever, so that the pivot $b$ may be changed from one to another, and also in order to adapt the machine to the difference in power to be applied—as, for instance, a man or a boy. I employ a similar set of adjusting-holes, $g'\ g'$, in the upper end of the rock-lever, so that the pivot $b'$ may be changed from one to another in a similar manner.

The shank D of the saw is likewise provided with a set of adjusting-holes, $h\ h$, Fig. 2, so that the position of the saw, relatively to the stick of wood $i$ which it is cutting, may be changed when desired in order to use the whole blade equally before sharpening, and also to center the saw on a large log. The shank D runs closely between guides $k\ k$, Figs. 1 and 2, to keep the saw in proper position in cutting.

To the top of the saw-shank D, at a suitable position, is jointed a rod, $l$, extending upward and being jointed in a like manner at the opposite end to a lever, I, pivoted to one of the standards B', and provided with one or more ratchets or notches $m$, Fig. 2, into which, when depressed, engages a pawl, K, also jointed to the standard.

It will be seen that this device does not interfere in the least with the regular reciprocations of the saw, nor with its fall as it cuts deeper into the wood; but by means of it the saw can be raised free from the stick or log, so that the same may be moved along for another cut, as indicated in red lines, and the saw may be sustained in this position for any desired length of time without stopping the machine.

There are several manifest advantages resulting from this arrangement of the saw, and the parts connected with it.

First. The saw and its shank are situated within the frame, thus placing the whole in the most compact and convenient form, and insuring its more regular and uniform action. In all other machines of this class with which I am acquainted the saw is situated in a direct instead of a reverse direction, and the whole length of the saw and its shank projects beyond the frame. Thus, outside guides are required to keep the saw in place and make it run true. By my arrangement the machine occupies only the length of the saw and its shank. This is not only the most convenient form for the machine in operation, but also the most convenient for transportation, either from manufactory to market, or from place to place in practical application. In the ordinary machine with the saw and shank projecting beyond the frame, the saw has to be detached from place before it can be transported a great distance. It will be seen that wherever desirable my saw may be shifted to a direct instead of a reverse position, which is sometimes necessary in operating in difficult places, when the frame cannot easily be placed; but, in order that the saw may occupy a reverse position, a special construction of the frame and the parts operating in connection with it is necessary, and such are not found in ordinary machines.

Second. The saw is made to act at the point where the operator stands in turning the crank, and therefore it is not only at all times under his observation, but also within his reach and perfectly subject to his control. It is frequently the case that small splinters of wood catch in the kerf and obstruct the action of the saw. When such is the case in ordinary machines, the operator has to go beyond the machine to remove the obstruction, and this is the case whether the saw may be raised or lowered by a cord or otherwise. In my machine but a single operator is necessary, and he is not obliged to leave the point where the crank is turned either to place the stick on the buck, secure it in place, as hereinafter described, saw the cut or remove the pieces, an effect which cannot be accomplished by any other device with which I am acquainted.

Third. By the employment of the adjusting-holes $g\ g$ and $g'\ g'$ in the rock-lever, I am enabled to adapt the length of the stroke or the power to be applied as may be desired, and also by the use of the adjusting-holes $h\ h$ in the saw-shank I can adjust as may be necessary to center the same to logs or to adapt it to cut in different positions an ordinary stick of wood. The use of the lever I and pawl K enables the operator to raise or lower the same without removing from place, and while the machine is in operation.

Beneath the saw at the front end of the machine is situated a buck, L, of suitable construction for holding the sticks of wood $i$. This buck I make removable, so that when large logs are to be sawed it may be taken out of the way, leaving the end of the frame entirely free for the log to be rolled in place.

To hold sticks of wood on the buck while being sawed, I employ a lever, M, Figs. 1 and 2, which is preferably made somewhat elastic or pliable, so as to spring, and whose inferior end is bent, as shown at $n$, so as to catch under any one of a set of ratchet-teeth, $o\ o$, secured to one of the standards B' B'. At a suitable position on top of the lever is jointed a pawl, $p$, extending upward and engaging with another set of ratchet-teeth, $q\ q$. The view of the ratchets in Fig. 3 is at right angles to the view of the same parts in Fig. 2.

The advantage of this arrangement will be seen at once. When the stick is in proper position to be sawed, a simple downward pressure on the lever M will fix it in place, so that it cannot become disturbed by the strain or jar, and when the lever is thus bent over the stick the pawl $p$ catches one of the ratchet-teeth $q$ and retains the whole in such a secure manner that the hand of the operator may be removed. The teeth $o\ o$ allow the lever to be placed higher or lower to adapt the same to any sized stick of wood it may be necessary to place on the buck. When the cut is completed, the lever is as easily released from its bearing on the stick.

What I claim as my invention, and desire to secure by Letters Patent, is—

The special arrangement of the machine, constructed substantially as described, consisting, essentially, of the reverse saw and shank D' D, rock-lever C, pitman E, lever I, with notch or notches $m$, pawl K, and the lever M, provided with pawl $p$ and the ratchets $o\ o$ and $q\ q$, substantially as and for the purposes herein set forth.

In witness whereof I have hereunto signed my name in the presence of two subscribing witnesses.

M. DEWEY.

Witnesses:
B. T. NEWTON,
H. C. MARTIN.